Aug. 30, 1966 R. EMEIS 3,268,975
METHOD OF PRODUCING A SEMICONDUCTOR MEMBER
Filed Feb. 19, 1963
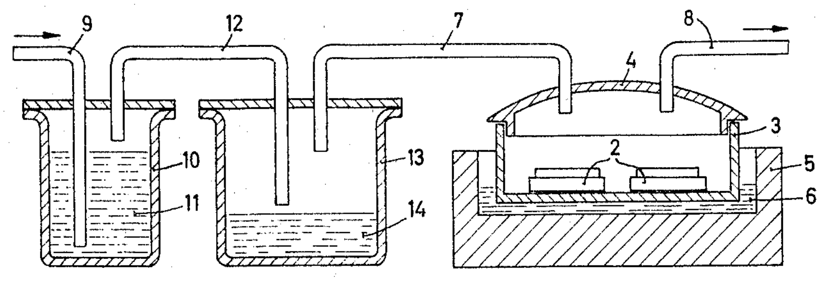

3,268,975

METHOD OF PRODUCING A SEMICONDUCTOR MEMBER

Reimer Emeis, Ebermannstadt, Germany, assignor to Siemens-Schuckertwerke Aktiengesellschaft, Berlin-Siemensstadt, Germany, a corporation of Germany Filed Feb. 19, 1963, Ser. No. 259,581
Claims priority, application Germany, June 19, 1962
S 79,972
4 Claims. (Cl. 29—25.3)

My invention relates to the production of electronic semiconductor members comprising a monocrystalline semiconductor body, preferably of silicon, to which metallic contact electrodes are attached. In a more particular aspect, my invention relates to a method of cleaning the surface of such semiconductor members, after attachment of the electrodes, with the aid of liquid composed of nitric acid and hyrofluoric acid.

The manufacture of semiconductor components requires cleaning the semiconductor surfaces by chemical etching, particularly on those surface areas where p-n junctions become externally accessible. Such etching serves to eliminate crystal defections and impurities otherwise apt to form bridges across the p-n junction. Mainly used is an etching liquid, commercially known as CP etching solution, which is composed essentially of nitric acid and hydrofluoric acid. The semiconductor body is either immersed in the processing liquid, or a jet of the liquid is directed onto the surface and then washed therefrom by a jet of water. When performing this method with semiconductor members that already possess metallic contact electrodes, attached for example by alloying or soldering, the etching liquid may entrain metal ions onto the semiconductor surface, thus contaminating the crystalline surface and impairing the electric qualities.

It is an object of my invention to eliminate such difficulties and to provide for an etching method that reliably prevents any migration of metal ions from attached contact electrodes onto bare areas of the semiconductor surface.

According to my invention, I subject the semiconductor bodies, after attaching the contact electrodes, without further intermediate treatment, to the effect of vapors coming from above an eching liquid composed of nitric acid and hydrofluoric acid, this dry vapor treatment being performed for a period of a few minutes up to several hours.

According to another feature of my invention it is preferable to maintain during the processing period a current of the etching vapors along and past the semiconductor surfaces to be cleaned so that the reaction products are carried away by the flowing vapors.

According to still another feature of my invention, the semiconductor bodies are heated during the just-mentioned treatment to a temperature above that of the vapors contacting the semiconductor surfaces. This prevents condensation of water at the semiconductor surfaces, while the nitric acid and hydrofluoric acid vapors can act upon the surfaces as desired.

The invention will be further explained with reference to an embodiment described presently by way of example with reference to the accompanying drawing in which a suitable form of processing equipment is schematically illustrated.

Semiconductor diodes can be produced, for example, as follows: Placed upon a molybdenum disc of about 20 mm. diameter and 2 mm. thickness is an aluminum foil of 19 mm. diameter and about 60 micron thickness. Placed on top of the aluminum foil is a silicon disc of about 300 micron thickness and 18 mm. diameter. A gold-antimony foil of about 15 mm. diameter and 15 micron thickness is then placed on top of the silicon disc. The foil may contain 0.5% antimony, for example, the remainder being substantially all of gold. The entire assembly is embedded in a powder of material non-reacting with the above-described components at the processing temperature, such powder being graphite, for example. While applying slight pressure to the embedded unit, it is heated in a furnace to about 800° C. so that the metal foils become alloyed together with the silicon disc.

After completion of this alloying process, the semiconductor diode possesses two contact electrodes consisting of the molybdenum disc, on the one hand, and of a gold-silicon eutectic, on the other hand.

According to conventional fabrication, the semiconductor surface left bare by the electrodes is now etched with the above-mentioned processing liquid, such as the commercially available CP etching solution. As mentioned, difficulties are then often encountered due to metal being carried by the liquid from the electrode onto the semiconductor surfaces.

According to the invention, however, the above-described alloying process is followed, without any intermediate active or chemically reactive treatment, by subjecting the semiconductor member to slight heating and exposing the member, while kept at elevated temperature, to the effect of vapors that evolve from the processing liquid conventionally used for etching. This treatment is performed for a few minutes up to several hours, a processing period of about 20 minutes, for example, being usually sufficient. It should be understood that, while no essential, particularly chemical, intermediate treatment is to be applied between complete attachment of the electrodes and the vapor treatment, it remains permissible to mechanically eliminate any residues of the graphite or other embedding powder, for example by blowing such powder away or washing it off with distilled water, if desired accompanied by application of ultrasonics.

Semiconductor diodes that have just been provided with contact electrodes as described above are schematically shown at 2 on the accompanying drawing. The semiconductor members are placed into a processing vessel 3 of polystyrene closed by a cover 4. The vessel 3 is mounted in a heating container 5 with which it is thermally coupled by a liquid 6, for example glycerin or water. The container 5 may consist of metal and may be heated electrically. The semiconductor members 2 are subjected to vapors which are supplied to the processing space through a pipe 7 extending through the cover 4, and which are discharged from the processing chamber through an outlet pipe 8. The pipes 7 and 8 preferably consist of synthetic plastic resistant to attack by the vapors, for example also of polystyrene. The processing vapors are forced into the processing vessel 3 with the aid of an inert gas or some other driving gas, for example nitrogen, that does not participate in the chemical reaction under the operating conditions. The driving or carrier gas is then passed above the level of a processing liquid composed of nitric acid and fluoric acid to pass the evolving vapors through the pipe 7 into the vessel 3.

In the illustrated embodiment, a current of nitrogen from a pressure bottle (not shown) is passed through a pipe 9 into a bubble counter consisting of a closed vessel 10 which contains liquid 11. The liquid may consist of paraffin oil or another liquid obtainable in a degree of purity sufficient for electronic semiconductor purposes. The nitrogen bubbles passing through the liquid can be readily observed so that the flow of gas can be supervised and controlled accordingly.

A pipe 12 conducts the gas to a second closed vessel 13 which accommodates the processing liquid 14 proper. The processing liquid is composed, for example, of hydrofluoric acid in 40% concentration and fuming nitric acid in 1:1 ratio. The carrier gas from pipe 12 is directed upon the level of the processing liquid where it becomes charged with the evolving vapors. The vessel 13 is preferably kept at constant temperature, for example normal room temperature (about 20 C.). The vapor-laden gas then passes from vessel 13 to the processing vessel 4 where it acts upon the exposed semiconductor surface areas. The vapors therefore also have a temperature of about 20° C. when entering into the processing vessel. The heating of the semiconductor members to a somewhat higher temperature prevents the entrained water from condensing on the semiconductor surfaces, thus excluding detrimental effects of water which otherwise would act as an electrolyte as in known etching methods. The semiconductor members are preferably kept at about 30 to 100° C. preferably 40 to 60° C., relative to operation with processing liquid at normal room temperature.

The vapors of the processing liquid have the effect of etching the semiconductor surfaces of the diodes. As a rule, no residues are formed because the resulting reaction products, such as silicon tetrafluoride, are likewise gaseous and are discharged through the outlet pipe 8.

The processing is continued until a sufficient etching action is reached. The necessary period of time depends upon such conditions as the quantity of the vapors being supplied, and upon the temperature of the semiconductor members. In some cases a processing period of 5 minutes is sufficient, although about 10 to 20 minutes are satisfactory as a rule. Processing for longer periods of time, such as up to 3 to 5 hours, is not detrimental.

For example, the semiconductor bodies may be heated to about 40 to 60° C. and subjected to the vapors of the processing liquid for a period of a few minutes up to a few hours. According to another applicable treatment, the semiconductor bodies are heated to about 50 to 100° C. and subjected to the vapors for a period from one to several hours, for example between 1 and 2 hours.

After such processing, the semiconductor members can be washed, for example with distilled water. Clean distilled water does not act as electrolyte and is completely harmless when etching liquid is absent. Thereafter the semiconductor members are dried and can then be coated with protective varnish and assembled with a protective housing or capsule. If desired, they may also be varnished without preceding washing, and then be encapsulated.

The process according to the invention can be modified in various ways. For example, semiconductor members whose crystalline body consists of germanium can be processed in the same manner. The semiconductor members may also consist of transistors, four-layer p-n-p-n junction devices and the like. Furthermore, the composition of the processing liquid can be varied within wide limits. Generally, any ratio of hydrofluoric acid to nitric acid between 1:3 and 3:1 can be applied for producing the desired dry etching effect. Argon or other noble gases are applicable instead of nitrogen as carrier or driving gas, in some cases also air or oxygen. The vapors of nitric acid and hydrofluoric acid may also be generated separately and be mixed only after reaching the processing vessel 3. The processing vessel may also be equipped with stirrer or impeller means for moving the gases and vapors.

Upon a study of this disclosure, such and other modifications will be obvious to those skilled in the art and are indicative of the fact that my invention can be given embodiments other than those particularly illustrated and described herein, without departing from the essential features of my invention and within the scope of the claims annexed hereto.

I claim:

1. The method of producing a semiconductor member, which comprises joining metallic contact electrodes with a monocrystalline semiconductor body, placing such bodies into a processing chamber, charging a current of substantially inactive gas with vapors from above the level of etching liquid composed of a mixture of hydrofluoric acid in about 40% concentration with fuming nitric acid in the approximate ratio of 1:1, and passing the vapor-laden gas current through the processing chamber for chemically cleaning the exposed semiconductor surfaces, while simultaneously heating the semiconductor body to a temperature above that of the vapor-laden gas current, and scavenging the reaction products away therefrom and out of the chamber.

2. The method of producing a semiconductor member, which comprises joining metallic contact electrodes with a monocrystalline semiconductor body, subjecting the semiconductor surface to chemical cleaning by exclusively vaporous medium evolving from etching liquid composed essentially of nitric acid and hydrofluoric acid, and heating the semiconductor body during said cleaning to a temperature higher than that of said vaporous medium contacting said body.

3. The method of producing a semiconductor member, which comprises joining metallic contact electrodes with a monocrystalline semiconductor body, thereafter subjecting the remaining semiconductor surface to chemical cleaning by exclusively vaporous medium evolving from etching liquid composed essentially of nitric acid and hydrofluoric acid, heating the semiconductor body to a minimum temperature of about 10° C. above the temperature of the vaporous medium contacting said body, and maintaining the conjoint vaporous and thermal treatment for a period of more than 5 minutes.

4. The method of producing a semiconductor member, which comprises joining metallic contact electrodes with a monocrystalline body of silicon, thereafter passing along the partially electrode-covered surface of the body a current of exclusively vaporous cleaning agent, evolving said vaporous current from liquid composed essentially of nitric acid and hydrofluoric acid having a mixing ratio between 1:3 and 3:1, and discharging the reaction products with the spent vapors, heating the body to a temperature of about 50 to about 100° C. during the flow of the vapor-laden gas current, and maintaining the treatment for a period of about one to several hours.

References Cited by the Examiner

UNITED STATES PATENTS

| | | | |
|---|---|---|---|
| 2,364,501 | 12/1944 | Wolfskill | 156—17 XR |
| 2,462,218 | 2/1949 | Olsen | 156—17 XR |
| 2,719,373 | 10/1955 | Allen | 156—17 XR |
| 2,744,000 | 5/1956 | Seiler | 156—17 XR |
| 3,079,254 | 2/1963 | Rowe | 156—17 XR |

OTHER REFERENCES

Duigon et al.: "Etch Polishing of Silicon Wafers," RCA Technical Notes, No. 521, March 1962.

RICHARD H. EANES, Jr., *Primary Examiner.*

D. M. SCHMIDT, *Assistant Examiner.*